United States Patent [19]

Green

[11] Patent Number: 5,124,695
[45] Date of Patent: Jun. 23, 1992

[54] DISPLAY DEVICE

[75] Inventor: Ian M. Green, Buckie, Scotland

[73] Assignee: THORN EMI plc, London, England

[21] Appl. No.: 532,152

[22] Filed: Jun. 1, 1990

Related U.S. Application Data

[63] Continuation of Ser. No. 98,111, Sep. 18, 1987, abandoned.

[30] Foreign Application Priority Data

Sep. 20, 1986 [GB] United Kingdom ............... 8622715

[51] Int. Cl.$^5$ ........................................... G09G 3/36
[52] U.S. Cl. ................................ 340/784; 340/793; 359/87; 359/88
[58] Field of Search ............... 340/767, 781, 784, 793, 340/805; 350/332, 333, 334, 336; 359/36, 54, 55, 87, 88

[56] References Cited

U.S. PATENT DOCUMENTS

| 3,647,958 | 3/1972 | Sobel | 340/793 |
|---|---|---|---|
| 3,845,243 | 10/1974 | Schmersal et al. | |
| 3,886,403 | 5/1975 | Owaki et al. | 340/767 |
| 3,997,719 | 12/1976 | Judice | 340/793 |
| 4,328,492 | 5/1982 | Bobak et al. | 340/793 |
| 4,427,979 | 1/1984 | Clerc et al. | 340/805 |
| 4,527,863 | 7/1985 | Glasper et al. | 340/784 |
| 4,531,160 | 7/1985 | Ehn | 340/793 |
| 4,559,535 | 12/1985 | Watkins et al. | 340/781 |
| 4,661,809 | 4/1987 | Anderson et al. | 340/793 |
| 4,672,357 | 6/1987 | Lorteije et al. | 340/793 |
| 4,712,877 | 12/1987 | Okada et al. | 340/793 |
| 4,752,774 | 6/1988 | Clerc et al. | 340/805 |
| 4,850,675 | 7/1989 | Hatanaka et al. | 340/793 |

FOREIGN PATENT DOCUMENTS

| 0151508 | 8/1985 | European Pat. Off. | |
| 0271960 | 6/1988 | European Pat. Off. | |
| 1390925 | 4/1975 | United Kingdom | |
| 2047453 | 11/1980 | United Kingdom | |
| 2217088 | 10/1989 | United Kingdom | 340/784 |

Primary Examiner—Alvin E. Oberley
Assistant Examiner—Richard Hjerpe
Attorney, Agent, or Firm—Fleit, Jacobson, Cohn, Price, Holman & Stern

[57] ABSTRACT

In a liquid crystal display, each pixel is formed of four separately energizable areas which have relative light outputs in the ratio 1:2:4:8 respectively, thereby allowing a range of 16 grey levels to be achieved by appropriate selection of areas. Each of the areas has a number of segments, which are spaced-apart but concentrically arranged, in order to have the same average position, so that different bit patterns cause the pixel to change brightness only, without any apparent positional change.

5 Claims, 5 Drawing Sheets

DISPLAY DEVICE

This application is a continuation of U.S. application Ser. No. 07/098,111, filed Sep. 18, 1987, now abandoned.

BACKGROUND OF THE INVENTION

The present invention relates to a display device and especially, but not solely, to a television receiver with a bistable display material e.g. ferroelectric liquid crystals.

U.S. Pat. No. 3,845,243 discloses a gas discharge display panel in which each display element is divided into several areas which can be individually energised. To display a grey scale the number of energised areas in each element is selected according to the required brightness value.

British Patent Specification No. 1390925 shows, in FIG. 9, an electrode divided into several areas which can be selectively energised to control brightness.

SUMMARY OF THE INVENTION

The present invention provides a display device comprising: a lattice of pixels to provide an image representing a picture signal;
  each pixel being divided into a plurality of areas each of which is individually settable to either of two states, only one said state producing a light output, the light outputs of the areas of a pixel not being the same;
  the areas of a pixel being arranged in substantially concentric manner.

The human eye is very sensitive to small errors in apparent pixel position. However the display device of the present invention overcomes any such positional error because the areas of a pixel may have essentially the same average position when viewed, so that different patterns of area driving in a pixel present a change of brightness, without any apparent positional change.

Preferably, the light outputs of the areas in a pixel have a binary relationship therebetween. Advantageously, a pixel has four distinct areas with light outputs in the ratio 8:4:2:1.

According to another aspect, the present invention also provides a display device comprising:
  a lattice of pixels to provide an image representing a picture-signal, each pixel being divided into a plurality of areas each individually settable to either of two states, only one said state producing a light output;
  means to effect two setting scans of the lattice for each received picture-signal;
  means to supply, in one said scan, to each of the pixels an amount of the relevant least-significant-bit information to effect setting for a first specified time period;
  and means to apply, in the other said scan, to each of the pixels an amount of the relevant most-significant-bit information to effect setting for a second specified time period.

Preferably, the display device has means to apply, in the first scan, the four least-significant-bits to set the pixels for substantially 1/17 of the time period for the picture, and means to apply, in the second scan, the four most-significant bits to set the pixels for substantially 16/17 of the time period for the picture.

The present invention also provides a method of operating a display device, having a lattice of pixels to provide an image, each pixel being divided into a plurality of areas each individually settable to either of two states, only one said state producing a light output, the method comprising:
  effecting two setting scans of the lattice for each received picture;
  applying, in one said scan, to each of the pixels an amount of the relevant least-significant-bit information to set the pixel for a first specified time period;
  and applying, in the other said scan, to each of the pixels an amount of the relevant most-significant-bit information to set the pixel for a second specified time period.

A display device embodying the present invention can be driven in any appropriate manner. For example, such a display device may be driven in accordance with a technique utilizing a number of drivers, each associated with a number of pixels, as described in a co-pending patent application belonging to the Applicant Company. Additionally or alternatively, there may be used a driving technique utilizing time modulation, as described in a co-pending patent application belonging to the Applicant Company.

The binary relationship of the areas in a pixel of the present invention ensures that an amount of grey levels substantially greater than the number of areas can be achieved. Thus for four areas, sixteen grey levels are produced.

Preferably, each pixel is formed of a plurality of selectively-settable liquid crystal cells.

The present invention is applicable to colour displays and to black-and-white displays.

The present invention also embodies a display panel for use in a display device as herein defined. Furthermore, the present invention also embodies equipment for the generation, and/or transmission, and/or processing, and/or reception, of signals suited and/or designed for a display device as herein defined.

DESCRIPTION OF THE DRAWINGS AND THE PREFERRED EMBODIMENTS

In order that, the invention may more readily be understood, a description is now given, by way of example only, reference being made to the accompanying drawings, in which.

The illustrated examples of the present invention involve the generation of a grey scale television image by the multiplexing of a bistable display material, namely ferroelectric liquid-crystal material, arranged to provide a lattice of pixels.

Figure 1:
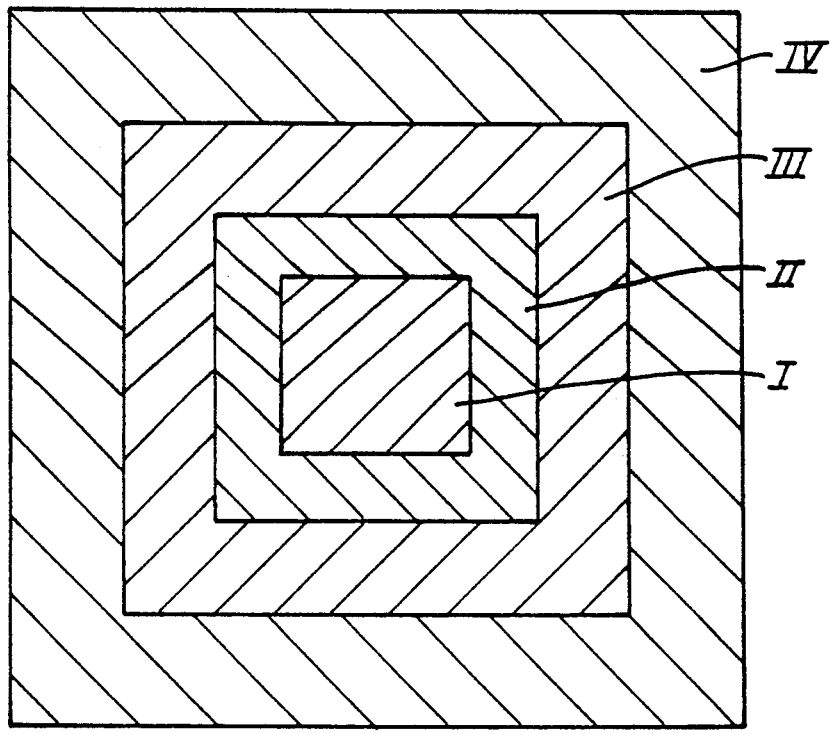
FIG. 1 is a simplified representation of a pixel of a display device according to the present invention.

Each pixel (see FIG. 1) is formed of four areas I, II, III, IV which have light outputs in the ratio 1:2:4:8 respectively, thereby allowing a range of 16 grey levels which can be achieved by appropriate selection of areas;

The concentric arrangement of the areas is significant. Since the human eye is very sensitive to small errors in apparent pixel position, it is important that each of the areas has the same average position, so that different bit patterns cause the pixel to change brightness only, without any apparent positional change.

Figure 2:
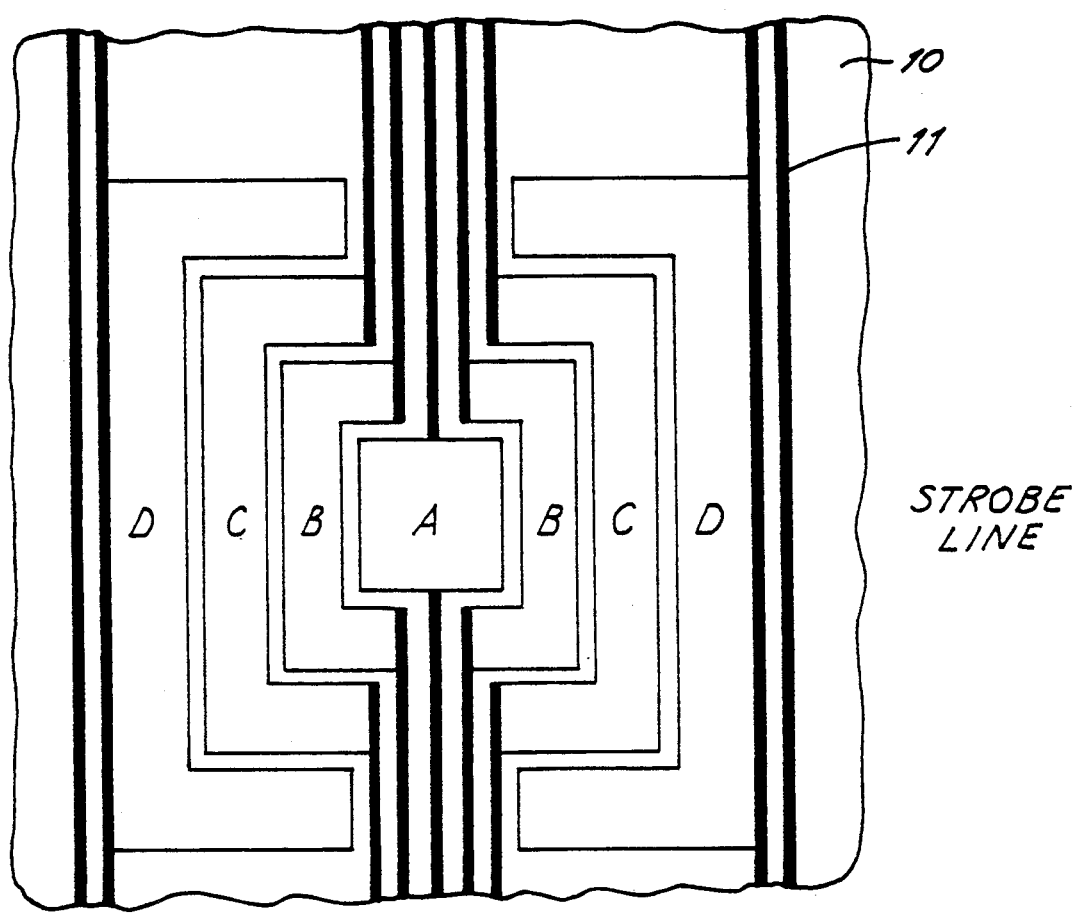
FIG. 2 is a plan view of a pixel embodying the present invention.

In one implementation, the four areas are etched onto one piece of glass coated with ITO, and all four areas are addressed with one strobe line 11 etched onto the opposite glass plate 10 (FIG. 2). However, the active area of each pixel is reduced because of the area taken up by metal tracks bringing in data, resulting in some dimming of the displayed image.

Figure 5:
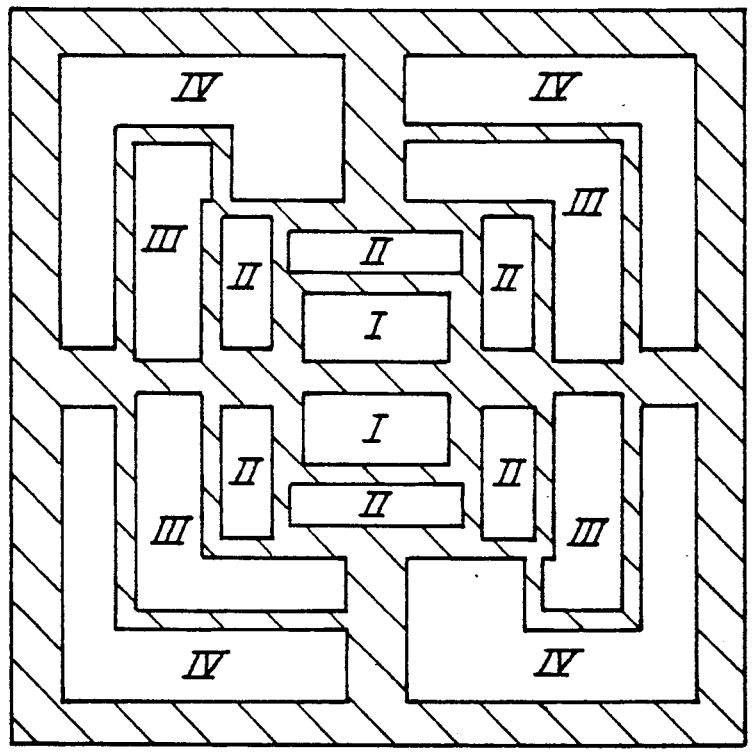
FIG. 5 is representation of the pixel arrangement when the patterning of FIGS. 3 and 4 are combined.
Figure 3:
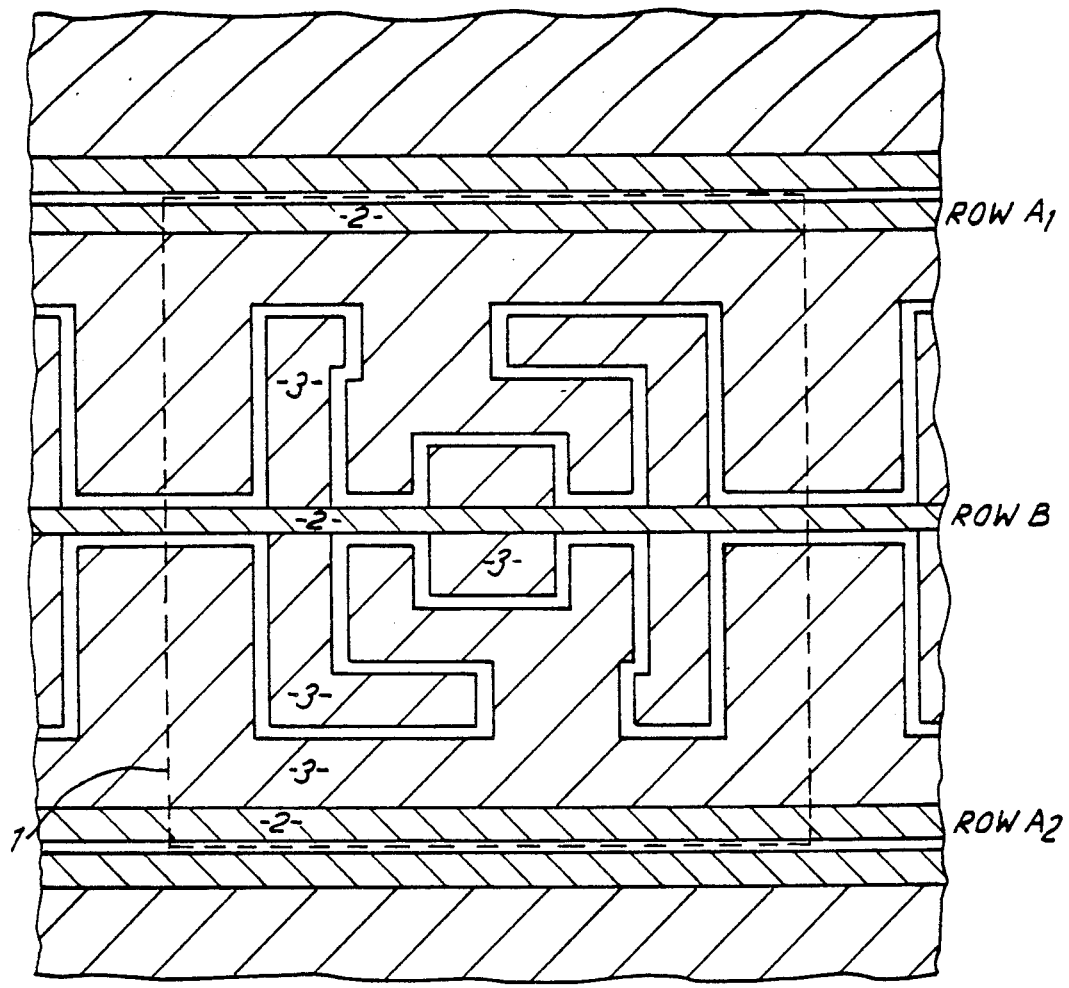
FIG. 3 is a plan view of the metallization row-patterning of a pixel in a display device according to the present invention.
Figure 4:
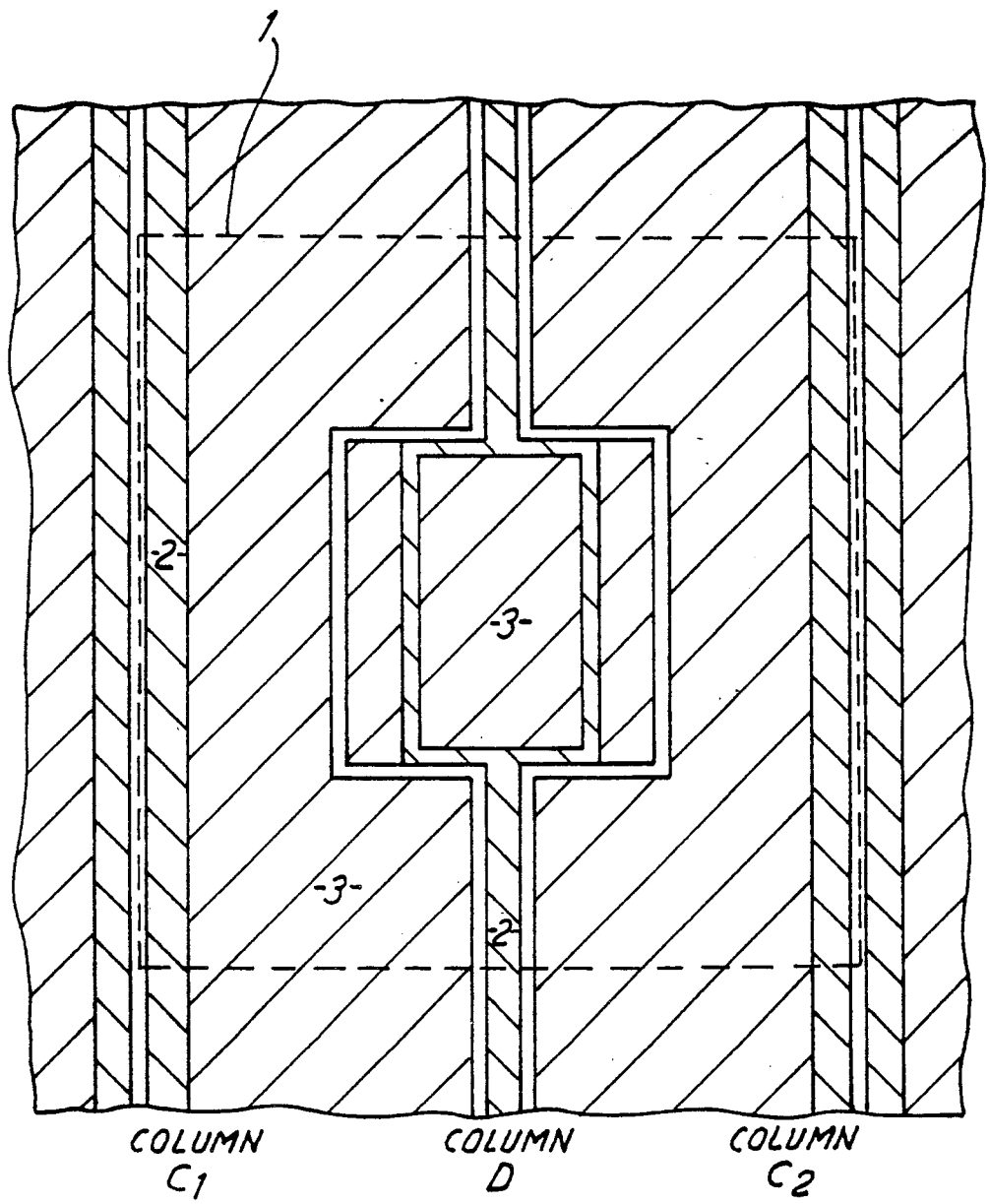
FIG. 4 is a plan view of the metallization column patterning of a pixel in a display device according to the present invention.

FIG. 3 to 5 illustrate a pixel metallization pattern for a liquid crystal display device embodying the present invention. FIG. 3 shows pixel boundary 1 and the row patterning formed by regions 2 of metal and regions 3 of ITO, with rows $A_1$ and $A_2$ relating to pixel areas II and IV and Row B relating to pixel areas I and III. FIG. 4 shows the column patterning again formed by regions 2 of metal and regions 3 of ITO, with Columns $C_1$ and $C_2$ relating to pixel areas III and IV, and Column D relating to pixel areas I and II. When these row and column patterning are overlapped, the resulting formation of pixel is as shown in FIG. 5.

This arrangement is advantageous in that it avoids conductor crossovers on either display plate, thereby eliminating the possibility of electrical shorts otherwise caused by pinholes in crossover insulation. As can be seen in the Figures, there are three row metallizations and three column metallizations; however two of the row metallizations are connect the edge of the screen, as are two of the column metallizations, the net result being that two external row drivers and two column drivers address the four areas of the pixel.

Omitted from FIG. 5 for the reason of simplicity is an appropriate opaque insulating pattern to stop the viewer seeing right to the edge of the areas. Also, it may be necessary to alter the width of the metal conductors from the dimensions as shown so that all the row and column electrodes have approximately equal time constants.

Figure 6:
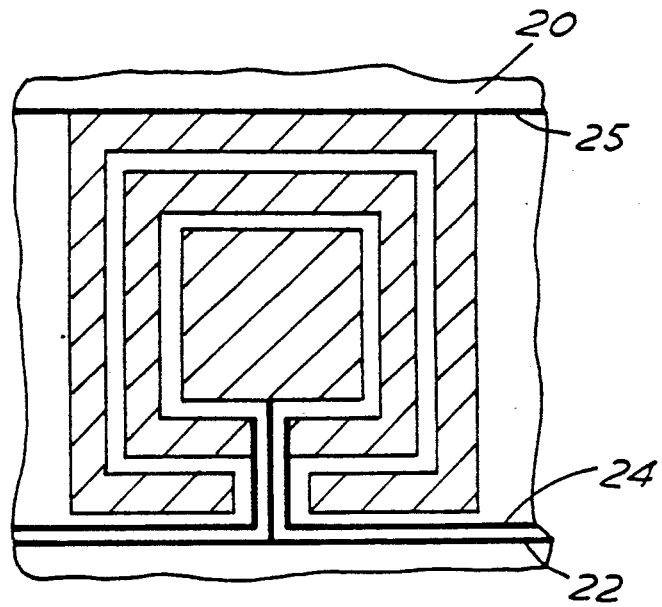
FIGS. 6 and 7 are plan views of the metallization patterning on the two plates for another form of pixel which embodies the present invention.
Figure 7:
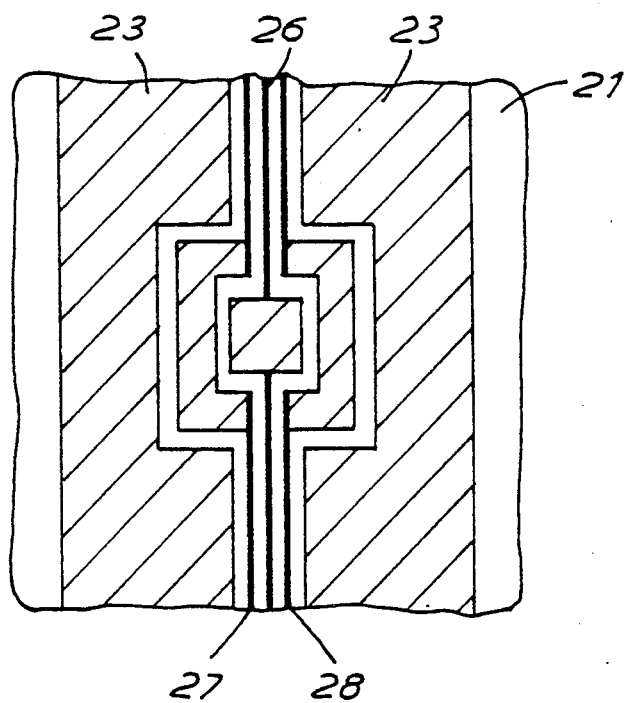

FIG. 6 illustrates the arrangement of strobe and data lines on one plate 20 in respect of one pixel of a display while FIG. 7 illustrates the arrangement of strobe and data lines on the other plate 21 in respect of the same pixel. In this arrangement, three electrodes address three areas on each glass plate, one strobe line and two data. The pixel is still split into selectively settable areas in the ratio of 8:4:2:1 but any combinations of strobe and data lines can be used. In this example, one strobe 22 covers the areas corresponding to outputs with the ratio values 1 and 2 and is on side one of the glass plate 20 while the other strobe 23 covers the areas with output ratio values 4 and 8 of plate 21 (see FIGS. 6 and 7). With this electrode scheme the display can be addressed in the same time as with other layouts but with minimization of the active area lost to the electrode pattern. The metal tracking is arranged so that tracks on one glass plate cover tracks on the other plate. In this layout, the strobe pulses move in different directions on the screen, strobe 22 moving vertically while strobe 23 moves horizontally. This may make it necessary to process more data per frame but may reduce flicker in 25 Hz sequentially refreshed displays. Also, the splitting of the strobe lines between the two plates is that both electrode and tracking patterns become of similar complexity, which is less (hence easier to manufacture, and with a higher degree of reliability) than the more complex plate in the type of arrangement of FIG. 2. Plate 20 also has a line 24 for data bit 3 and a line 25 for data bit 4. Plate 21 has a line 26 for data bit 1 and lines 27, 28 for data bit 2.

In operating a display device having pixels of the illustrated type, the four least significant bits of the image are input to the pixel as the video signal arrives, and the four most significant bits are input to the same pixel 1/17 of the frame time later. Thus two display lines need to be addressed every video line. The most significant bits are displayed for 16/17 of the time, and the least significant for 1/17 of the time. Flicker will be minimal, and the data storage required is 1/34 of a frame store, being half the number of bits for 1/17 of the time. Such an operation enables the display device to achieve a range of 256 grey levels.

If 256 levels are insufficient to avoid contours in the blacks or mid greys, then the operation may be extended to 12 bits by inputting the 4 least significant bits as the video signal arrives, the middle 4 bits 1/273 of a frame later, and the most significant bits 16/273 of a frame after that. The storage required for a 12 bit display is not significantly greater than that for an 8 bit display, but the time in which to address a pixel is less, as three display lines rather than two need to be addressed in one video line time.

If an 8 bit display is sufficient, then during the 64 microsecond line time the row of pixels corresponding to the current video line should be addressed, together with the row corresponding to 37 (i.e. 625/17) lines previously. Thus 32 microseconds is allowed for the addressing of a row of pixels. Since the arrangement of FIG. 2 allocates two independent row electrodes to each pixel row, there is 16 microseconds to address each 'row' of subpixels.

The display device of the invention acts as an accurate D/A converter, converting the input digital data into visible light intensity. Therefore, to avoid contouring effects, the normal requirements of a D/A converter as regards bit accuracy and stability etc. must be met. For example, the time delay between displaying the sets of 4 bits determines the relative brightness, and should be accordingly accurate; this can be readily achieved. The bistable display material may not switch completely between states immediately, but may take some time to settle; such an effect could be compensated by adjusting the exposure time of the least significant bits, or by altering the stored bit pattern. To minimize errors caused by relative inaccuracy of the bit areas in the pixel patterning, and their sensitivity to misalignment of the front and back plates, the active transparent area of pixel area on one plate is arranged to be larger than that on the other plate, such that a small misalignment between the two plates does not alter the visible pixel area.

The display device of the invention allows the maximum time for multiplexing bistable pixels, while still allowing the grey scale display to be updated at video rates. Also, it minimizes display flicker, and minimizes the amount of data storage required. Because of the maximum action of the time of addressing each row of the display, the pixels are updated in sequence and are continuously visible. If a colour display is required, separate red, green, and blue pixels must be used rather than field sequential colour with monochrome pixels.

I claim:

1. A liquid crystal display device comprising a lattice of pixels for providing an image representing a picture-signal, type pixels comprising first and second electrode structures and being divided into a plurality of sub-pixels, which sub-pixels are defined by areas of overlap between the first and second electrode structures and are individually settable in a first light transmission state allowing the transmission of light therethrough, or a second light transmission state inhibiting the transmission of light therethrough; each electrode structure further including addressing means having signal input paths for enabling the subpixels of each pixel to be addressed with signals via the input paths, the first and second electrode structures each having two respective input paths coupled thereto, thereby to form a two by two array of input paths, and the sub-pixels being arranged in a substantially concentric manner and having a binary relationship therebetween, and being configured to enable each pixel to be individually set to any one of sixteen light transmission states by the addressing thereof via the two by two array of input paths, and such that each pixel has four distinct areas with light transmission states in the ratio 8:4:2:1.

2. A display device according to claim 1 wherein each pixel has four distinct areas defined by the sub-pixels, which sub-pixels are configured so as to define a viewing area which is substantially square and substantially in the centre of which is situated a first group of sub-pixels having the lowest combined area, substantially surrounding which first group of sub-pixels are arranged a second group of sub-pixels having a larger combined area than the first group by a factor of two, substantially surrounding which second group of sub-pixels are arranged a third group of sub-pixels having a combined area larger than the second group of sub-pixels by a factor of two, and which third group of sub-pixels are substantially surrounded by a fourth group of sub-pixels having a combined area larger than the third group of sub-pixels by a factor of two.

3. A display device according to claim 1 wherein both first and second electrode structures include addressing means having three input paths, two of which paths carry identical signals to each electrode structure.

4. A method of operating a liquid crystal display device comprising a lattice of pixels for providing an image representing a picture-signal, the pixels comprising first and second electrode structures and being divided into a plurality of sub-pixels, which sub-pixels are defined by areas of overlap between the first and second electrode structures and are individually settable in a first light transmission state allowing the transmission of light therethrough, or a second light transmission state inhibiting the transmission of light therethrough; each electrode structure further including addressing means having signal input paths for enabling the sub-pixels of each pixel to be addressed with signals via the input paths, the first and second electrode structures each having two respective input paths coupled thereto, thereby to form a two by two array of input paths, and the sub-pixels being arranged in a substantially concentric manner and having a binary relationship therebetween such that each pixel has four distinct areas with light transmission states in the ratio 8:4:2:1 and being configured to enable each pixel to be individually set to any one of sixteen light transmission states by the addressing thereof via the two by two array of input paths, the method comprising:

effecting two setting scans of the lattice for each received picture-signal;

applying, in one scan, to each of the pixels an amount of the relevant least-significant-bit information to set the pixel for a first, specified time period; and applying, in the other scan, to each of the pixels an amount of the most-significant-bit information to set the pixel for a second, specified time period.

5. A method according to claim 4, comprising applying, in the first scan, the four least-significant-bits to set a pixel for substantially 1/17 of the time period for the picture-signal, and applying, in the second scan, the four most-significant bits to set a pixel for substantially 16/17 of the time period for the picture-signal.

* * * * *